United States Patent [19]

Torning

[11] Patent Number: 4,517,446
[45] Date of Patent: May 14, 1985

[54] HEATING SHELF

[75] Inventor: Ralph R. Torning, Glastonbury, Conn.

[73] Assignee: Safeway Products Inc., Middletown, Conn.

[21] Appl. No.: 372,183

[22] Filed: Apr. 26, 1982

Related U.S. Application Data

[63] Continuation-in-part of Ser. No. 310,618, Oct. 13, 1981, abandoned.

[51] Int. Cl.³ .............................................. F27D 11/02
[52] U.S. Cl. ...................................... 219/386; 219/449; 219/461; 219/462; 219/521; 219/510; 219/533; 312/236
[58] Field of Search ............... 219/201, 214, 218, 385, 219/386, 387, 430, 439, 441, 447, 449, 528, 530, 540, 460, 461, 462, 464, 450, 533; 312/236; 99/447; 165/64, DIG. 25, DIG. 26

[56] References Cited

U.S. PATENT DOCUMENTS

| | | | |
|---|---|---|---|
| 2,009,790 | 7/1935 | Shroyer | 219/462 X |
| 2,099,499 | 11/1937 | Raney | 219/449 |
| 2,306,979 | 12/1942 | Potsdam | 219/449 |
| 3,114,027 | 12/1963 | Busch et al. | 219/450 |
| 3,191,004 | 6/1965 | Hocker | 219/461 |
| 3,908,749 | 9/1975 | Williams | 219/386 X |
| 4,041,277 | 9/1977 | Shumrak et al. | 219/386 |
| 4,068,115 | 1/1978 | Mack et al. | 219/386 |
| 4,093,041 | 6/1978 | Davis et al. | 219/386 X |
| 4,254,824 | 3/1981 | Springer | 165/64 |
| 4,331,857 | 3/1982 | Thomas et al. | 219/521 |

FOREIGN PATENT DOCUMENTS

| 957284 | 8/1949 | France | 219/449 |
|---|---|---|---|
| 1392763 | 2/1965 | France | 219/449 |

*Primary Examiner*—Volodymyr Y. Mayewsky
*Attorney, Agent, or Firm*—Hayes & Reinsmith

[57] ABSTRACT

A heating device designed to be used within a refrigerated environment is provided with at least a first plate which is electrically insulated from an underlying resistance heater circuit. Plural insulating layers beneath the resistance heater reflect heat back toward the plate. The entire assembly is sealed against moisture.

19 Claims, 6 Drawing Figures

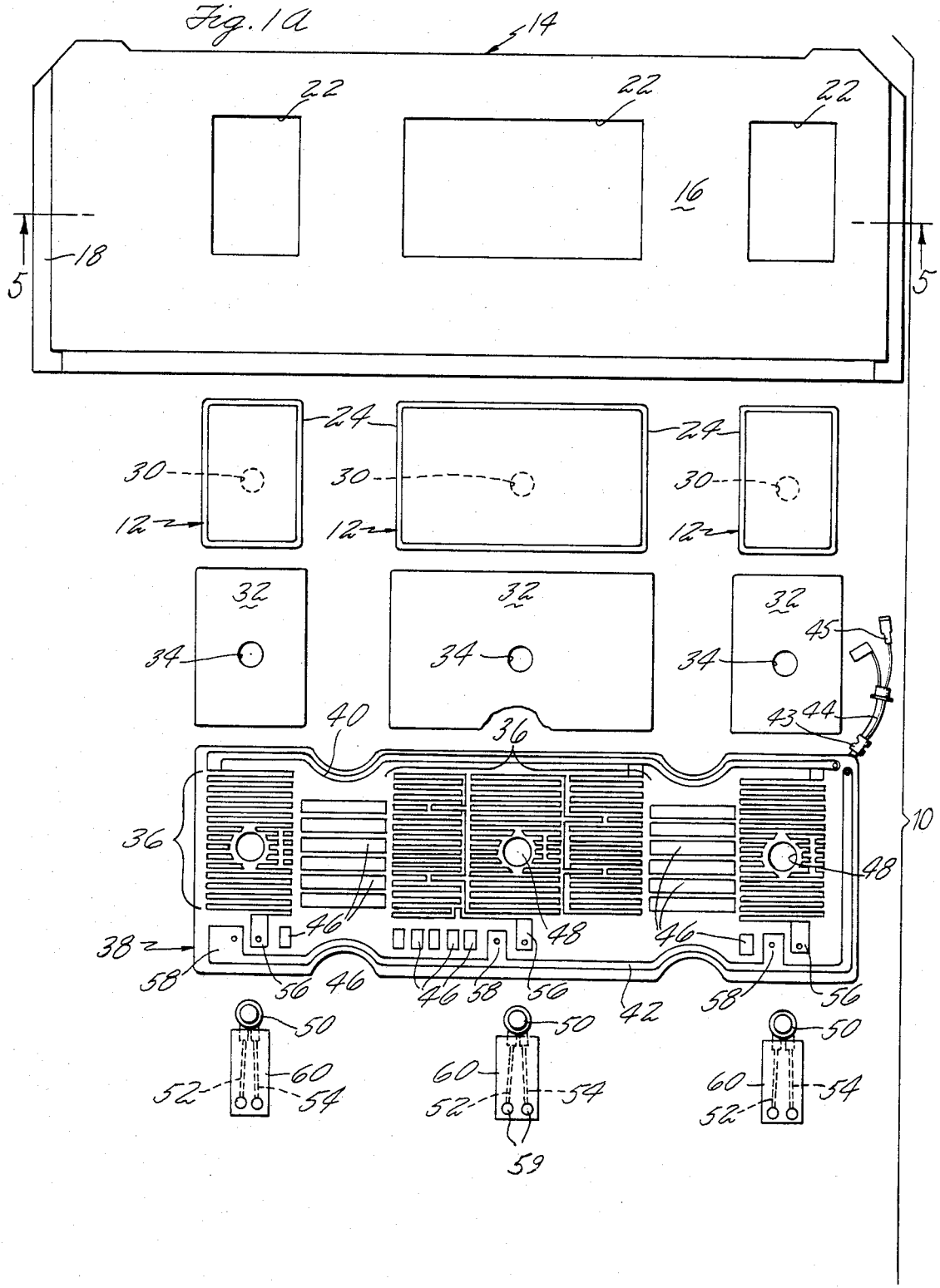

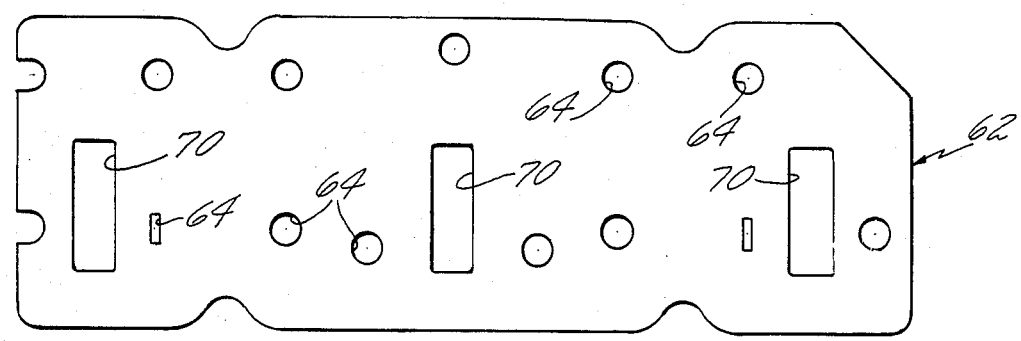
Fig. 1B
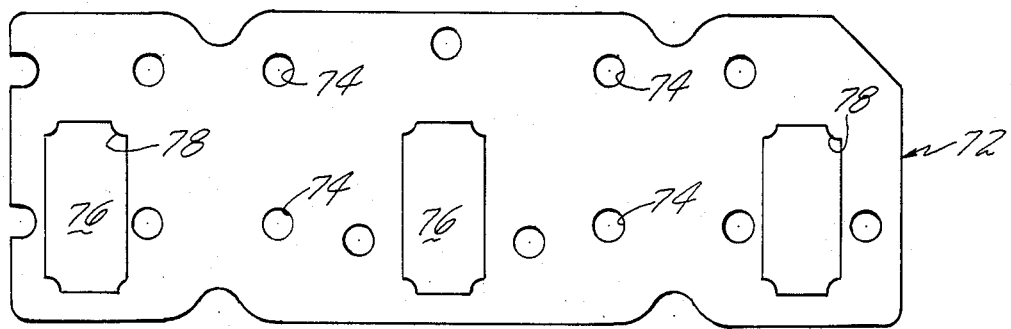
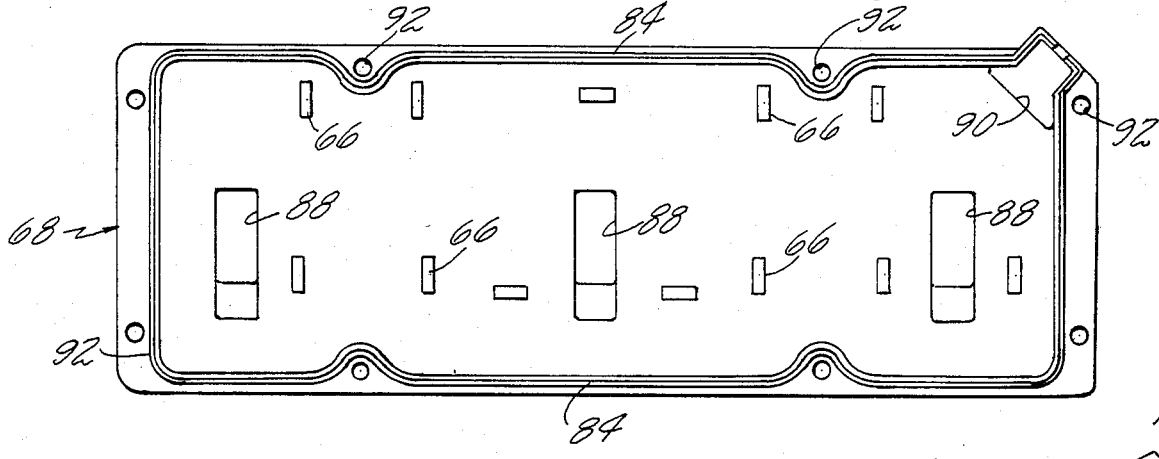
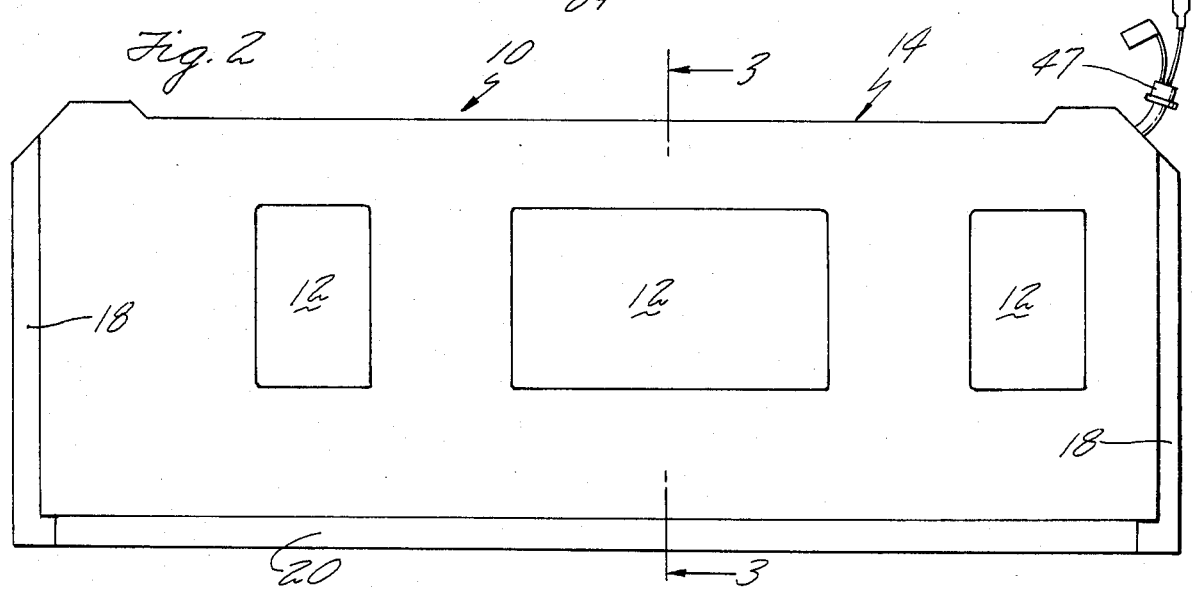
Fig. 2

HEATING SHELF

BACKGROUND OF THE INVENTION

1. Field of the Invention

The present invention relates to the warming of products such as foods. Specifically, the present invention is directed to a heating shelf used to selectively heat food being transported and/or stored in serving dishes or the like.

2. Description of the Prior Art

There are numerous situations, for example in hospitals, where it is necessary to transport prepared meals to individuals. These prepared meals typically include both hot and cold food portions. In order to conveniently transport these meals both the hot and cold portions of each separate meal are retained together for serving on a tray. These trays are placed on shelves in a cart and the cart is stored in refrigerated cabinets.

Previous attempts to efficiently heat specified areas of the shelves, and thus the food portions positioned above the heated areas, without significant heat transfer to adjacent areas by lateral conduction and radiation have not provided the desired results.

SUMMARY OF THE PRESENT INVENTION

The present invention overcomes the above-discussed deficiencies and other disadvantages by providing a manner of locally heating food portions which may be positioned adjacent to unheated portions and which may be temporarily stored within a refrigerated environment.

In accordance with the present invention a shelf, which is removably mounted within a carrier unit, is provided with one or more hot plates. These hot plates each have an exposed surface upon which a food container, i.e., a serving dish, can be positioned. A thermally insulated cover for the heated dish or dishes will minimize heat lose to the ambient environment which may be a refrigerated cabinet in which the carrier unit it temporarily housed.

In a preferred embodiment the shelf of the present invention is provided with plural individually heated plates, each plate being associated with a resistance heater, the electric heater being connected in parallel. Each resistance heater is provided with its own control thermostat and is electrically insulated from its associated hot plate.

The shelf assembly is designed to allow for thermal expansion and contraction of the various parts. Most importantly, the shelf of the present invention provides for heating of the serving dish supporting plate portion or portions thereof without lateral conduction and radiation so that adjacent shelf portions, which may support dishes for food portions which are to be cooled or served at room temperature, will not be heated. The shelf assembly is also sealed to prevent moisture infiltration which could occur when the heating units begin to cool down within a refrigerated area.

BRIEF DESCRIPTION OF THE DRAWING

The present invention may be better understood and its numerous objects and advantages will become apparent to those skilled in the art by reference to the accompanying drawing, wherein like reference numerals refer to like elements in the several FIGURES, and in which:

FIGS. 1A and 1B comprise a top exploded view of one embodiment of the tray of the present invention wherein the various components are arranged in descending order from the top outer case to the bottom backer plate with each of the components being depicted in a top plan view:

FIG. 2 is a top view of the fully assemblied tray of FIG. 1;

DESCRIPTION OF THE PREFERRED EMBODIMENT

Figure 3:
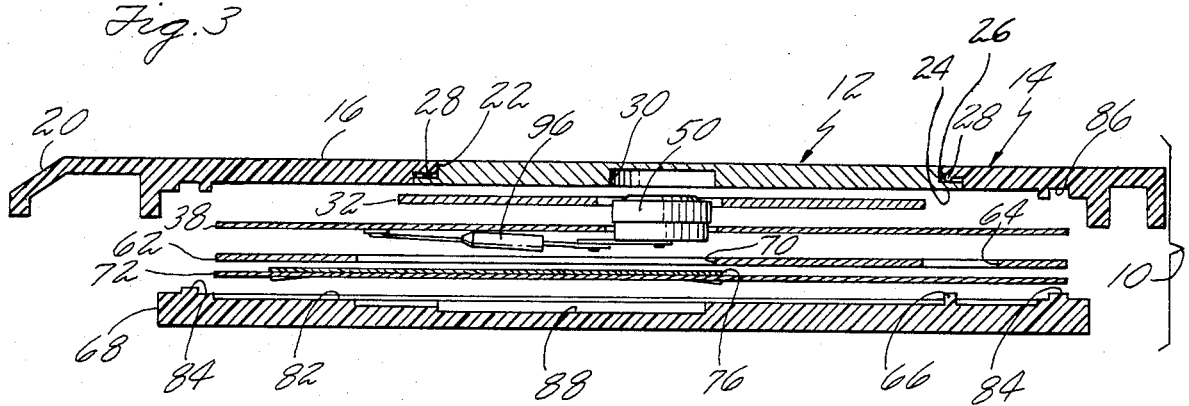
FIG. 3 is a cross-sectional view taken along line 3—3 of FIG. 2.

Referring to all the FIGURES jointly, a heating shelf in accordance with the preferred embodiment of the present invention is indicated generally at 10. Shelf 10 will normally be located within a carrier, not shown, and will have a tray bearing serving dishes containing food portions positioned thereon. The carrier may, for example, comprise a cart in which a plurality of heating shelves are supported in parallel, spaced relationship. The cart, in turn, may be stored in a refrigeration unit after the shelves have been loaded. Some of the food portions on the trays positioned on the shelves will require heating and thus the serving dishes containing these portions will be positioned in registration with the exposed surfaces of heated plates 12.

The shelf 10 includes an upper housing member 14 which is generally rectangular in shape with its upper surface 16, as best seen in FIGS. 1A and 2, being flat. The opposite side edges of upper surface 16 of member 14 are recessed relative to surface 16 to define recessed edges or lips 18 along the oppositely disposed side edges of housing 14. The recessed edges 18 function as guide rails and allow shelf 10 to be inserted into a carrier having parallel support channels in the sides thereof. A third side of member 14, which defines the forward, i.e., exposed, edge when the shelf is installed in a carrier, is provided with a camming surface 20 (FIG. 3) which is inclined with respect to flat surface 16. Camming surface 20 serves as an entry guide for a tray carrying food portions, not shown, onto the upper surface 16 of shelf 10.

Plates 12 are positioned within apertures 22 formed in member 14. The upper exposed surfaces of plates 12 are typically painted with a high temperature paint. Plates 12, in a preferred embodiment, are comprised of a aluminum to allow for good heat transfer. The circumference of each of plates 12 is defined by a shoulder 24 of reduced thickness. These plate shoulders are sized and shaped to receive reduced thickness rim portions 26 of member 14 which extend about the apertures 22. The cooperation between plate shoulder 24 and rim portions 26 assures the proper positioning of each plate 12. The surface of each rim portion 26 which contacts a shoulder 24 of a plate 12 is provided with an array of small projections 28 extending toward shoulder 24. These projections define a space between the shoulders 24 of the plates 12 and the rims 26 about the apertures 22. This space is filled with a suitable high temperature adhesive that locks the plates 12 in position and also allows for the expansion and the contraction of plates 12 relative to member 14. The backs of plates 12 are provided with recesses 30, preferably of circular shape, for the purposes which will be discussed below.

A pad 32 is positioned behind each of plates 12. Pads 32 are formed from a high temperature insulating material, for example, a silicone rubber sheet. Resistance heaters or heater circuits 36 on a flexible insulating substrate 38 are positioned adjacent to the pads 32 on the side of pads 32 opposite to plates 12, with the heaters 36 in contact with the pads 32. The pads 32 are employed to secure resistance heaters 36 to plates 12. In the case of silicone rubber pads, the requisite registration of the plates 12 and heater circuits 36 and bonding therebetween is acheived through vulcanization of the rubber pads 32. A hole 34 is provided through each pad 32. The holes 34 are each aligned with a corresponding recess 30 in a plate 12. The pads 32 electrically insulate the plates 12 from the underlying resistance heater circuits 36.

The substrate 38 is comprised of an insulating material having the appropriate high temperature characteristics. In a typical case the resistance heaters are formed by bonding a layer of metal foil to substrate 38 and then etching the foil to define the heater circuit pattern or patterns. The resistance heater circuits 36 are connected in parallel between bus conductors 40 and 42 in the manner to be described below. Bus conductors 40 and 42 are also formed from the etched foil and are connected to separate conductors of an electrical wiring harness 44. The substrate 38 is provided some degree of stiffness through the use of metal foil strips 46, which are formed similarly to and at the same time as circuits 36. Substrate 38 is also provided with cut-outs 48 that are aligned with holes 34 and plate recesses 30.

Electrical wiring harness 44 is provided with a grommet 43 which locks the harness 44 within the shelf and prevents breaking of the connection with the bus conductors 40 and 42. Grommet 43 is engaged by two opposing nubs of a locking member 45 on upper housing member 14. Harness 44 is further provided with a plug 47 for sealing a hole in the carrier through which the current supply conductors are positioned.

A temperature control device 50, typically in the form of a thermostat switch including a bimetallic element, or any other suitable thermostat type device, is positioned within each of recesses 30, through holes 34 and cut-outs 48. The leads 52 and 54 of thermostats 50 are respectively electrically connected to a terminal 56 of a resistive heating circuit 36 and a terminal 58 which is directly connected to bus conductor 42. Preferrably, the leads 52 and 54 of each thermostat 50 and the terminals 56 and 58 are soldered to eyelets 59 which are contained in an insulating pad 60. The incorporation of the thermostats 50 into the heater circuits regulates the flow of electrical current to the individual resistance heaters 36 and thus regulates the amount of heat transferred to the plates 12.

The plates 12 are heated by the resistive heating circuits 36 through the pads 32, but remain electrically insulated from the heating circuits. This reduces the possibility of electrical shock while using the shelf 10.

In order to minimize heat loss through the back of shelf 10 plural thermal insulating layers are used. The first insulating layer, which is placed behind the substrate 38, is indicated generally at 62. Layer 62, which preferably is a ceramic fiber pad, is provided with apertures 64 which received posts 66 which extend from a backer plate 68. Layer 62 is also provided with rectangular cut-outs 70 in which thermostats 50 are positioned. The backer plate 68 and upper housing member 14 are comprised of a high temperature thermoplastic polyester material.

The second thermal insulating layer is a reflective sheet 72 which will typically be comprised of metal (such as aluminum). Sheet 72 is also provided with apertures 74 which are aligned with apertures 64 in layer 62. The posts 66 of backer plate 68 extend through apertures 74 into apertures 64. High temperature insulating pads 76 are positioned between sheet 72 and thermostats 50. Pads 76 prevent short circuits between thermostats 50 and metal sheet 72, it being preferrable that sheet 72 be extended behind thermostats 50. The metal sheet 72 assures the reflection, back toward the plates 12, of the generated heat. Preferably, pads 76 are retained in position upon sheet 72 by inserting the corners of pads 76 through slits 78 provided in sheet 72.

Figure 4:
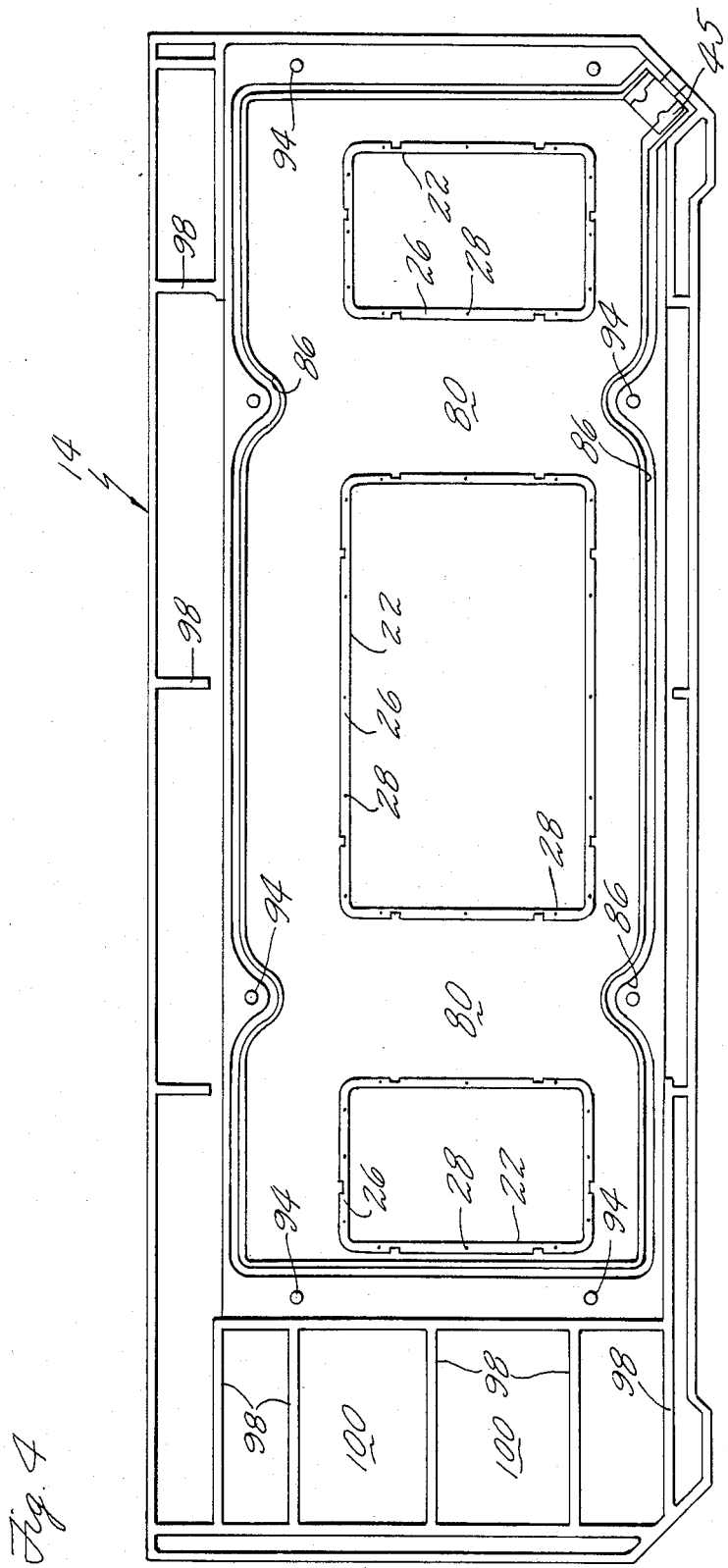
FIG. 4 is a bottom view of the top outer case of the apparatus of FIGS. 1-3.
Figure 5:
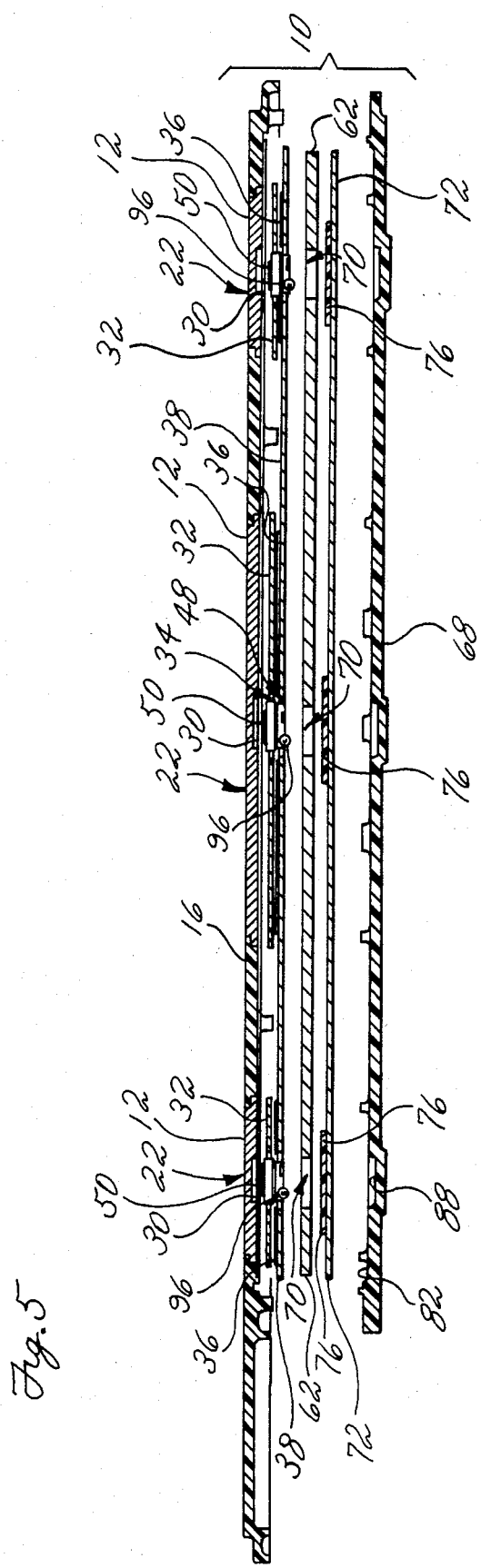
FIG. 5 is a longitudinal cross section view taken along line 5—5 of FIG. 1.

The layer 62 and sheet 72 are shaped to be fitted into a recess 80 which is defined by a lip 81 on the inwardly facing side of upper housing member 14. Backer plate 68 includes an inwardly extending projection 84 which defines a recess 82 into which layer 62 and sheet 72 are received when backer plate 68 is mated with housing member 14. The projection 84 is received within a channel 86 (FIG. 4) of housing member 14. The backer plate 68 is also provided with depressions 88 and 90 which respectively allow for the placement of thermostats 50 and the establishment of electrical connection to the bus conductors 40 and 42

Backer plate 68, and thus insulating layer 62 and metal sheet 72, are retained in place by two methods. Firstly, a high temperature sealant/adhesive (such as an RTV silicone) is injected into channel 86 before the ridge 84 is positioned therein. Plate 68 is further provided with holes 92 for receiving posts 94 which extend inwardly from housing member 14. These posts 94 protrude beyond the plate 68 so that a clip, not shown, may be attached thereto. This allows plate 68 to be retained in place while the adhesive injected into channel 86 cures.

To further protect against overheating the thermostats 50 may be provided with one-time fuses 96 in series with one of the leads 52 or 54, as best seen in FIG. 3.

Both housing member 14 and backer plate 68 are provided with means to prevent warpage of the shelf 10 due to thermal contraction and expansion. Plate 68 is provided with the aforementioned posts 66 which secure layer 62 and sheet 72 in position. Housing member 14 is provided with various ridges or fins 98, best seen in FIG. 4, which provide some degree of stiffening.

While a preferred embodiment has been described and illustrated various modifications and substitutions may be made thereto without departing from the spirit and scope of the invention. Accordingly, it is to be understood that the present invention has been described by way of illustration and not limitation.

What is claimed is:

1. In apparatus for selectively heating at least a first portion of planar support without significant heat transfer to adjacent portions, the support including upper and lower housing defining members of thermally and electrically insulated material, the upper housing defining member including a flat surface with at least a first aperture therein, the improvement comprising:

a plate, said plate being commensurate in size and shape with the first aperture in the upper housing defining member, said plate being retained in the upper housing defining member first aperture, said plate having a planar upper surface, said plate having a recess in a lower surface disposed oppositely with respect to said upper surface, said plate having a peripheral portion, said plate being comprised of a material having high thermal conductively;

heater means, said heater means including an electric current responsive heating element;

means securing said heater means in close proximity to said plate lower surface, said securing means electrically insulating said heating element from said plate while establishing an intimate heat transfer relationship;

thermal insulating means, said thermal insulating means being positioned adjacent to said heater means on the side of said heater means disposed oppositely with respect to said plate; and means responsive to the temperature of said plate upper surface for controlling said heater means, said temperature responsive means including a temperature sensor positioned in said plate lower surface recess.

2. The apparatus of claim 1 wherein said heater means comprises:

at least a first resistance heating circuit supported on a layer of electrical insulating material.

3. The apparatus of claim 2 wherein the upper housing defining member is provided with a rim portion of reduced thickness within its lower surface about the aperture and wherein said plate has a peripheral shoulder which engages the upper housing member rim portion.

4. The apparatus of claim 1 further including:

stand-off means, said stand-off means defining a space between the peripheral portion of said plate and the upper housing defining member; and high temperature adhesive means in the said space defined by said stand-off means.

5. The apparatus of claim 3 further comprising:

stand-off means, said stand-off means defining a space between facing surface of said plate shoulder and the upper housing member rim portion; and a high temperature adhesive disposed in the said space defined by said stand-off means.

6. The apparatus of claim 5 wherein said stand-off means comprises a plurality of projections extending inwardly from the upper housing member rim portion.

7. The apparatus of claim 1 wherein said securing means comprises:

a pad of high temperature electrical insulating material, said pad being provided with an aperture in registration with said plate lower surface recess, said temperature responsive means being in part disposed in said aperture.

8. The apparatus of claim 4 wherein said securing means comprises:

a pad of high temperature electrical insulating material, said pad being provided with an aperture in registration with said plate lower surface recess, said temperature responsive means being in part disposed in said aperture.

9. The apparatus of claim 6 wherein said securing means comprises:

a pad of high temperature electrical insulating material, said pad being provided with an aperture in registration with said plate lower surface recess, said temperature responsive means being in part disposed in said aperture.

10. The apparatus of claim 1 wherein said thermal insulating means comprises:

a pad of thermal and electrical insulating material, said pad being juxtaposed to said heater means; and a sheet of heat reflective material positioned on the side of said pad disposed away from said heater means.

11. The apparatus of claim 4 wherein said thermal insulating means comprises:

a pad of thermal and electrical insulating material, said pad being juxtaposed to said heater means; and a sheet of heat reflective material positioned on the side of said pad disposed away from said heater means.

12. The apparatus of claim 9 wherein said thermal insulating means comprises:

a second pad of thermal and electrical insulating material, said second pad being juxtaposed to said heater means; and a sheet of heat reflective material positioned on the side of said second pad disposed away from said heater means.

13. The apparatus of claim 12 wherein said heater means is provided with an aperture in registration with the aperture in said securing means pad and wherein said second pad is also provided with an aperture which is in registration with the aperture in said securing means pad, said temperature responsive means being in part disposed in said registered apertures.

14. The apparatus of claim 1 wherein the upper housing defining member is provided with a plurality of spacially displaced apertures and wherein said apertures further comprises:

at least a second plate, said second plate being commensurate in shape and size with a second upper housing defining member aperture, said second plate being positioned in the second aperture and having a planar upper surface, said second plate having a recess in a lower surface disposed oppositely with respect to said upper surface, and second plate being comprised of a material having high thermal conductivity; and said heater means including an electric current responsive heating element secured in close proximity to said second plate lower surface in heat transfer relationship therewith and electrically insulated therefrom.

15. The apparatus of claim 14 wherein said heater means includes at least first and second resistance heater circuits, said circuits being respectively aligned with said plates.

16. The apparatus of claim 15 wherein said temperature responsive means individually controls said first and second heater circuits and includes a temperature sensor positioned in each of said plate lower surface recesses.

17. The apparatus of claim 16 wherein the upper housing member is provided with a rim portion of reduced thickness within its lower surface about each plate receiving aperture and wherein said plates each have a peripheral shoulder commensurate in shape with the rim portion about its respective aperture and further wherein said apparatus comprises:

stand-off means, said stand-off means defining a space between each plate shoulder and the cooperating upper housing defining member rim portion; and a high temperature adhesive disposed in said spaces.

18. The apparatus of claim 17 wherein said heater means is provided with an aperture in the region of each of said heater circuits, said apertures being in registration with said plate recesses and wherein said securing means comprises:

pads comprised of high temperature electrical insulating material, said pads being positioned behind each of said heater circuits and each being provided with an aperture in registration with said plate recess and heater means apertures, said temperature responsive means being in part disposed in said registered apertures.

19. The apparatus of claim 18 wherein said thermal insulating means comprises:
a pad of thermal and electrical insulating material, said pad being juxtaposed to said heater means; and
a sheet of heat reflective material positioned on the side of said pad disposed away from said heater means.

* * * * *